United States Patent [19]

Wright

[11] Patent Number: 5,048,778
[45] Date of Patent: Sep. 17, 1991

[54] TRASH BAG APPARATUS

[76] Inventor: Randolph L. Wright, 5716 Remsen, Memphis, Tenn. 38135

[21] Appl. No.: 597,570

[22] Filed: Oct. 15, 1990

[51] Int. Cl.$^5$ .............................................. A63B 55/08
[52] U.S. Cl. ........................................ 248/98; 141/391
[58] Field of Search .................. 248/95, 97, 98, 99, 248/100, 101, 907; 141/391, 314, 316; 220/404, 908

[56] References Cited

U.S. PATENT DOCUMENTS

| | | |
|---|---|---|
| 76,686 | 4/1868 | Yaggy . |
| 247,220 | 9/1881 | Smith . |
| 306,310 | 10/1884 | Young ............................. 248/98 X |
| 617,961 | 1/1899 | Johnson ........................ 141/314 X |
| 1,414,575 | 5/1922 | McCart ......................... 248/101 X |
| 1,858,793 | 5/1932 | Reynolds ............................ 248/97 |
| 1,994,980 | 3/1935 | Cook ............................ 248/101 X |
| 2,172,529 | 9/1939 | Barker et al. ...................... 248/97 |
| 3,818,956 | 6/1974 | Chamberlain ...................... 141/316 |
| 4,191,226 | 3/1980 | Kyte ................................. 141/391 |
| 4,273,167 | 6/1981 | Stillwell ........................ 141/391 X |
| 4,357,728 | 11/1982 | Pravettone ........................ 15/257.4 |
| 4,470,627 | 9/1984 | Carroll et al. .................. 141/391 X |
| 4,483,440 | 11/1984 | Ware ............................... 220/404 X |
| 4,485,855 | 12/1984 | Dillingham ....................... 141/316 |
| 4,550,440 | 10/1985 | Rico ................................. 220/908 |
| 4,749,158 | 6/1988 | Buckley ............................... 248/98 |
| 4,792,171 | 12/1988 | Lamy .............................. 294/68.3 |

Primary Examiner—Ramon O. Ramirez
Attorney, Agent, or Firm—Walker & McKenzie

[57] ABSTRACT

An apparatus for holding a trash bag. The apparatus includes base structure having an opening therethrough for allowing the body portion of the trash bag to extend therethrough and having a lip adjacent the opening for allowing the opened end of the body portion of the trash bag to be folded there over; and funnel structure having an opened first end for being positioned within the hollow body portion of the trash bag and within the opening of the base structure and having an opened second end. The funnel structure has a passageway extending between the first and second ends thereof for allowing trash inserted into the second end to pass therethrough into the hollow body portion of the trash bag. The cross-sectional area of the passageway at the second end of the funnel structure is larger than the cross-sectional area of the passageway at the first end of the funnel structure and larger than the cross-sectional area of the opened end of the body portion of the trash bag.

13 Claims, 3 Drawing Sheets

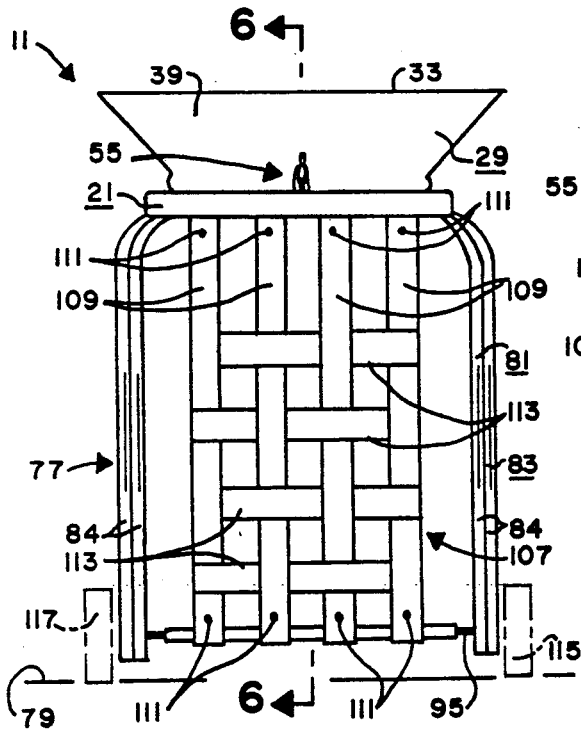
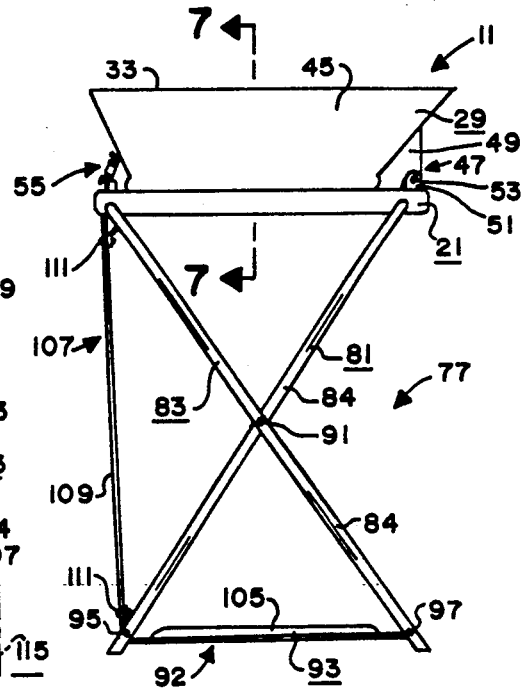
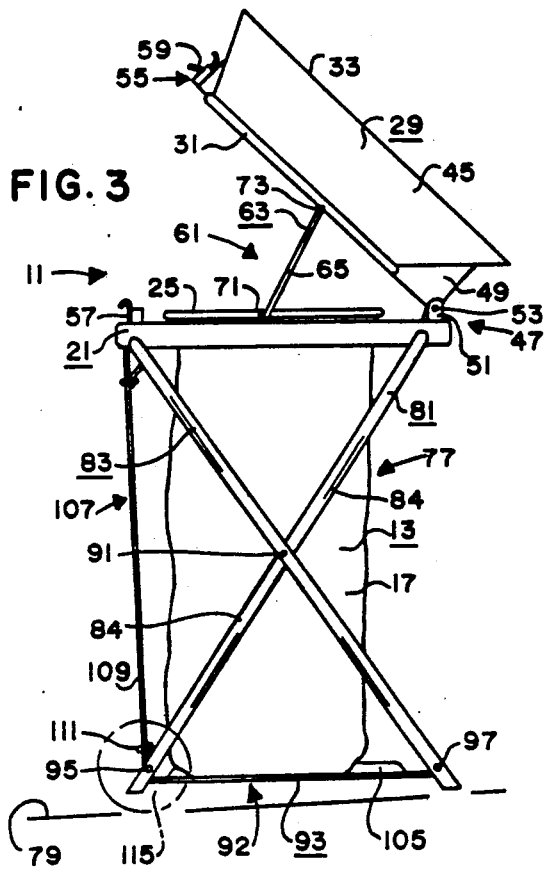
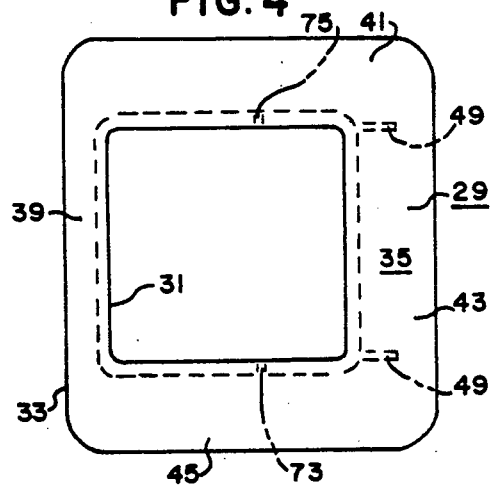
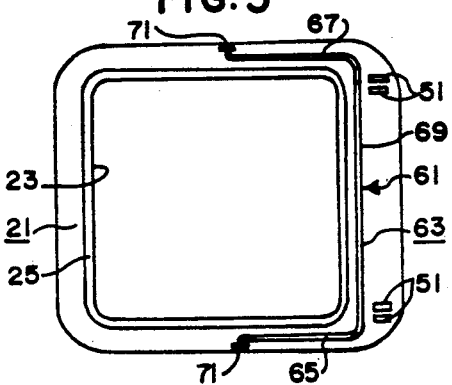

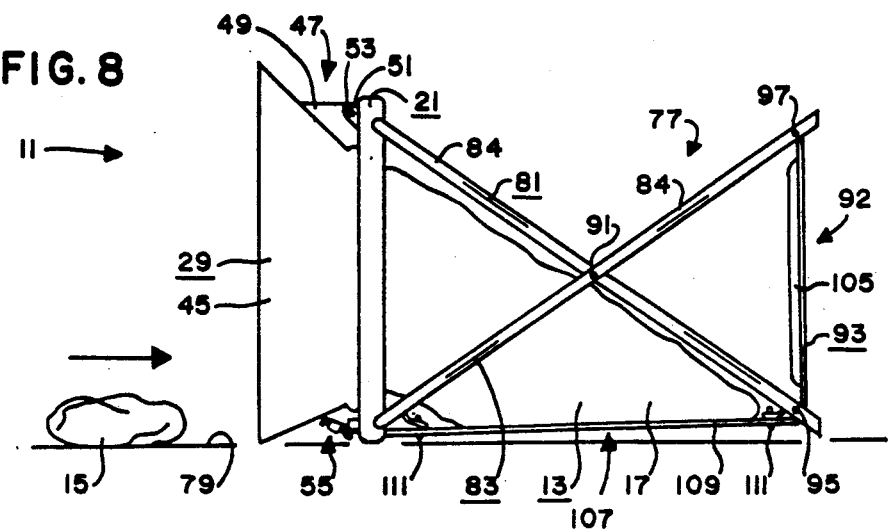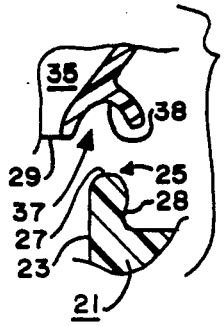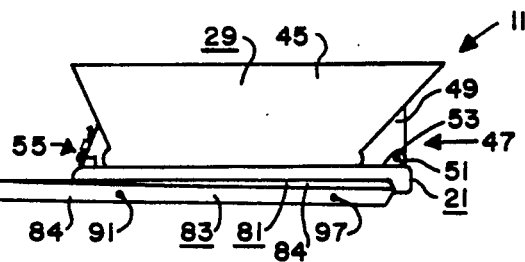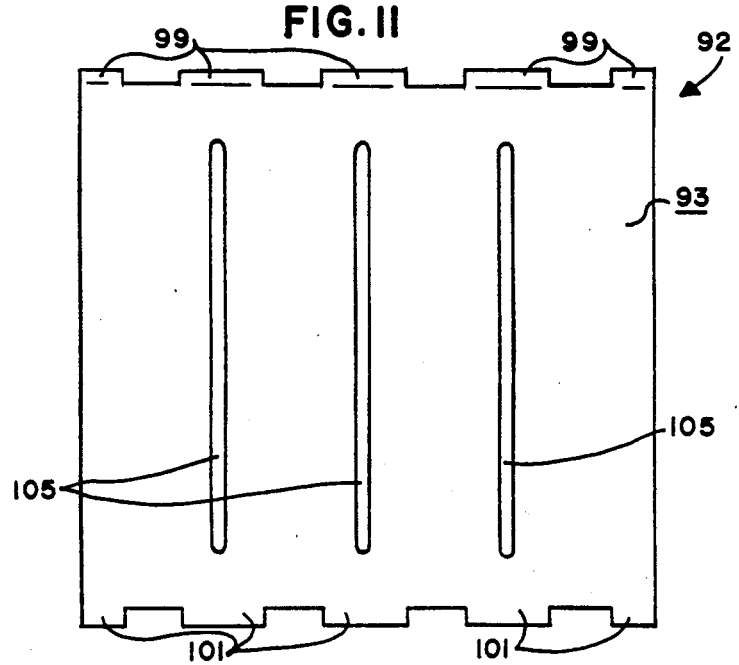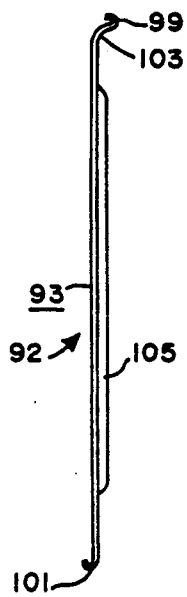

TRASH BAG APPARATUS

BACKGROUND OF THE INVENTION

1. Field of the Invention

The present invention relates, in general, to an apparatus for holding trash bags and allowing the trash bags to be filled with trash.

2. Information Disclosure Statement

A preliminary search conducted in class 248, subclasses 97, 98, and 99 disclosed the following patents:

Yaggy, U.S. Pat. No. 76,686. Yaggy discloses a device for holding bags open and in an upright position, to enable the bag to be readily filled with grain. The Yaggy device includes a vertical post having a first ring firmly secured in a horizontal position on the upper end thereof, and having a second ring pivotally attached to the upper end thereof. The mouth of a bag is clamped between the first and second rings to thereby hold the bag in an opened, upright position.

Smith, U.S. Pat. No. 247,220. Smith discloses a device for use in filling and transporting bags and sacks. The device includes a generally vertical frame rollably supported by wheels. A ring is attached in a horizontal position to the upper end of the frame and a hopper is hinged to the frame for clamping the mouth of the bag to the frame.

Barker et al, U.S. Pat. No. 2,172,529 discloses a bag holder. The Barker bag holder includes a vertical standard having a horizontal bar adjustably mounted thereon. A hopper for fitting within the mouth of a bag to be filled is resiliently attached to the horizontal bar.

Chamberlain, U.S. Pat. No. 3,818,956. Chamberlain discloses a holder for holding a thin-walled bag such as a freezer bag in a position for easy filling. The Chamberlain bag holder includes a generally tubular, open ended bag support member and a funnel-like member which press-fits around the upper rim of the bag support member. The funnel member includes a chute that leads into the interior of a bag that is clamped between the funnel and the support.

Pravettone, U.S. Pat. No. 4,357,728. Pravettone discloses a combination dust pan and refuse container made up of a framework which distends and substantially encloses a conventional disposable trash bag, and a dust pan which depends outwardly from the frame near the mouth of the bag.

Buckley, U.S. Pat. No. 4,749,158. Buckley discloses a utility stand for supporting a trash bag in an upright manner with its top open to receive trash. The Buckley stand includes a frame member including a bag attachment section and four leg members, a platform attached to and supported by the legs below the bag attachment section for supporting the bottom of the trash bag, a chute member pivotally attached to the frame, and a lid carried by the chute member for selectively closing the trash bag.

Lamy, U.S. Pat. No. 4,792,171. Lamy discloses a device for maneuvering large capacity bags filled with powdered or granular materials. The Lamy device includes at least four hollow, intersecting tubes for receiving the fork elements of a forklift truck and for being attached to the straps of a bag.

Nothing in the above patents discloses or suggests the present invention. More specifically, nothing in the above patents discloses or suggests an apparatus including base means having an opening therethrough for allowing the body portion of a trash bag to extend therethrough and having a lip adjacent the opening for allowing the opened end of the body portion of the trash bag to be folded there over; and funnel means having an opened first end for being positioned within the hollow body portion of the trash bag and within the opening of the base means and having an opened second end, the funnel means having a passageway extending between the first and second ends thereof for allowing trash inserted into the second end to pass therethrough into the hollow body portion of the trash bag, the cross-sectional area of the passageway at the second end of the funnel means being larger than the cross-sectional area of the passageway at the first end of the funnel means and larger than the cross-sectional area of the opened end of the body portion of the trash bag.

SUMMARY OF THE INVENTION

The present invention is directed toward providing an improved apparatus for holding trash bags and allowing the trash bag to be filled with trash. The concept of the present invention is to provide an apparatus to which a trash bag can be easily fastened, and which holds the mouth of the bag open to allow the bag to be easily filled with trash.

The apparatus of the present invention includes base means having an opening therethrough for allowing the body portion of a trash bag to extend therethrough and having a lip adjacent the opening for allowing the opened end of the body portion of the trash bag to be folded there over; and funnel means having an opened first end for being positioned within the hollow body portion of the trash bag and within the opening of the base means and having an opened second end. The funnel means has a passageway extending between the first and second ends thereof for allowing trash inserted into the second end to pass therethrough into the hollow body portion of the trash bag. The cross-sectional area of the passageway at the second end of the funnel means is larger than the cross-sectional area of the passageway at the first end of the funnel means and larger than the cross-sectional area of the opened end of the body portion of the trash bag.

FIG. 1 is a front elevational view of the trash bag apparatus of the present invention with certain optional components shown in broken lines.

FIG. 2 is a side elevational view of the trash bag apparatus of the present invention.

FIG. 3 is a side elevational view similar to FIG. 2 but with portions of the apparatus shown in an opened position, with certain optional components shown in broken lines, and with a trash bag combined therewith.

FIG. 4 is a top plan view of the funnel means of the trash bag apparatus of the present invention.

FIG. 5 is a top plan view of the base means of the trash bag apparatus of the present invention.

FIG. 8 is a side elevational view of the trash bag apparatus of the present invention in a horizontal position and with a trash bag combined therewith.

FIG. 9 is an exploded sectional view showing a portion of the base means and the funnel means of the trash bag apparatus of invention.

FIG. 10 is a side elevational view of the trash bag apparatus of the present invention in a folded position.

FIG. 11 is top plan view of a pan member of the trash bag apparatus of the present invention.

FIG. 12 is a side elevational view of the pan member of FIG. 11.

DESCRIPTION OF THE PREFERRED EMBODIMENT

Figure 6:
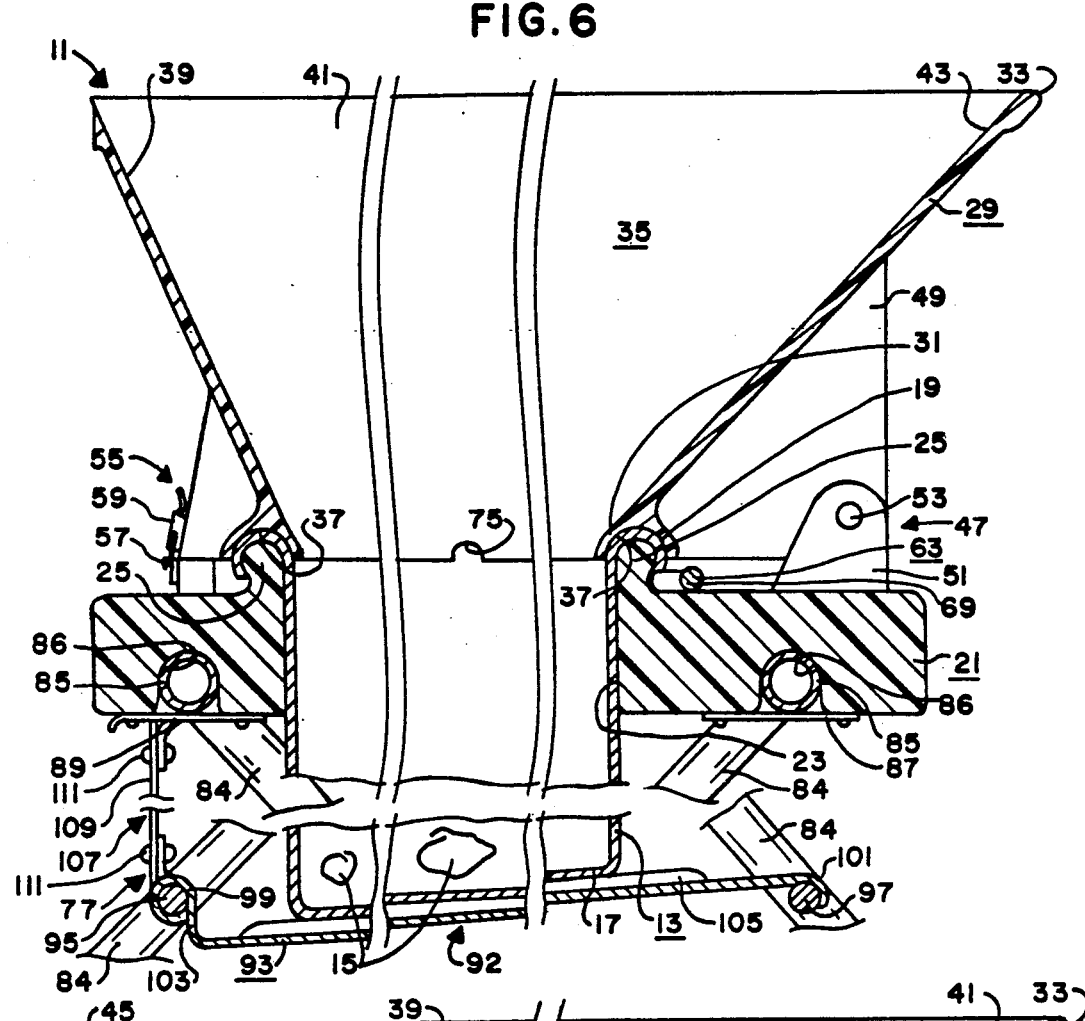
FIG. 6 is an enlarged sectional view substantially as taken on line 6—6 of FIG. 1 with portions thereof broken for clarity.

The preferred embodiment of the apparatus 11 of the present invention is designed to hold a 39 gallon plastic or paper trash bag 13 and to allow the trash bag 13 to be easily filled with trash 15 or the like. The trash bag 13 preferably consists of a typical 39 gallon plastic or paper disposable trash bag having a hollow body portion 17 and an opened end or mouth 19.

The apparatus 11 includes a base means 21 having an opening 23 therethrough for allowing the body portion 17 of the trash bag 13 to extend therethrough and having a lip 25 adjacent the opening 23 for allowing the opened mouth 19 of the trash bag 13 to be folded there over. The lip 25 preferably has a rounded, convexed upper surface 27 and a rounded, concaved outer side 28 for allowing the mouth 19 of the trash bag 13 to be stretched there over without tearing, etc., as will now be apparent to those skilled in the art. The opening 23 is preferably substantially square when viewed in plan and the lip 25 preferably completely encircles the opening 23 (see, for example, FIG. 5). The base means 21 may be constructed in various manners and out of various materials. Preferably, the base means 21 is molded out of plastic as a rigid, light weight unit as will now be apparent to those skilled in the art.

Figure 7:
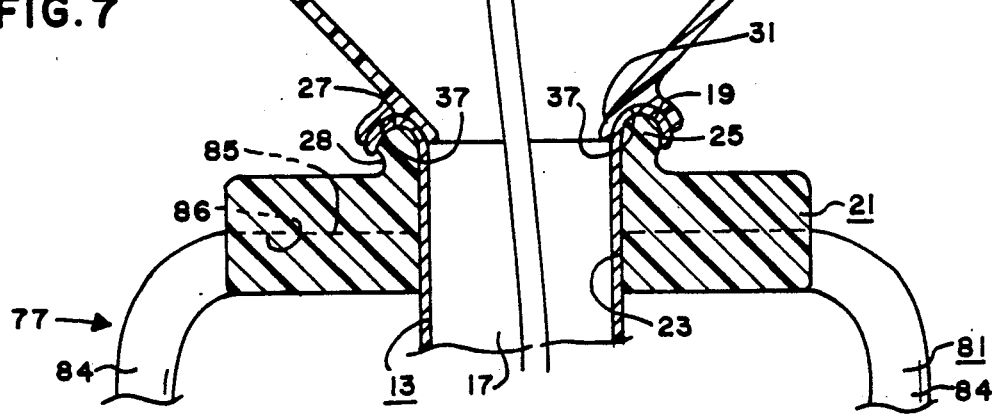
FIG. 7 is an enlarged sectional view substantially as taken on line 7—7 of FIG. 2 with portions thereof broken away for clarity.

The apparatus 11 includes a funnel means 29 having an opened first end 31 for being positioned conterminous with or within the hollow body portion 17 of the trash bag 13 and conterminous with or within the opening 23 of the base means 21, and having an opened second end 33. The funnel means 29 has a passageway or chute 35 extending between the first and second ends 31, 33 thereof for allowing trash 15 to be inserted into the second end 33 thereof and to pass out of the first end 31 thereof into the hollow body portion 17 of the trash bag 13. The cross-sectional area of the chute 35 at the second end 31 of the funnel means 29 is larger than the cross-sectional area of the chute 35 at the first end 31 of the funnel means 29 and larger than the cross-sectional area of the opened mouth 19 or the hollow body portion 17 of the trash bag 13 to make it easier to place trash 15 in the funnel means 29 as will now be apparent to those skilled in the art. The first end 31 of the funnel means 29 preferably has a groove portion 37 for coacting with the lip 25 of the base means 21 to clamp the mouth 19 of the trash bag 13 there between. Thus, with the mouth 19 of the trash bag 13 folded over the lip 25, the groove portion 37 of the first end 31 of the funnel means 29 can be pressed against the upper surface 27 of the lip 25 to thereby clamp the mouth 19 of the trash bag 13 therebetween as will now be apparent to those skilled in the art. The groove portion 37 of the first end 31 of the funnel means 29 preferably has a concaved lower surface 38 that is substantially a mirror image to the convexed upper surface 27 of the lip 25 of the base means 21 for partially receiving the convexed upper surface 27 of the lip 25 and a portion of the trash bag 13 as clearly shown in FIGS. 6, 7, and 10. The chute 35 is preferably substantially square when viewed in plan (see, in general, FIG. 4) and the groove portion 37 preferably completely encircles the opened first end 31 of the funnel means 29). Thus, the chute 35 is preferably formed by a substantially planar first wall 39, a substantially planar second wall 41, a substantially planar third wall 43, and a substantially planar fourth wall 45 joined together at substantially right angles to one another and tapering inwardly from the second end 33 of the funnel means 29 toward the first end 31 thereof (see, in general, FIGS. 6 and 7). The first wall 39 preferably tapers inwardly at a lesser angle than the walls 41, 43, 45 as clearly shown in FIGS. 6 and 7 for reasons which will hereinafter become apparent. Thus, when the apparatus is in the vertical position shown in FIGS. 6 and 7, the first wall 39 is preferably approximately 25 degrees from vertical while the walls 41, 43, 45 are approximately 45 degrees from vertical. The second end 33 of the funnel means 29 adjacent the walls 41, 43, 45 is preferably rounded as shown in FIGS. 6 and 7 while the upper end 33 of the funnel means 29 adjacent the first wall 39 is preferably sharp as shown in FIG. 6 for allowing trash 15 to be easily swept thereover when the apparatus 11 is in the horizontal position shown in FIG. 8 and thus providing a dust pan feature. The funnel means 29 may be constructed in various manners and out of various materials. Preferably, the funnel means 29 is molded out of plastic as a rigid, light weight unit as will now be apparent to those skilled in the art.

The apparatus 11 preferably includes hinge means 47 for attaching the funnel means 29 to the base means 21 and for allowing the funnel means 29 to be moved between an opened position (see FIG. 3) and a closed position (see FIGS. 1 and 2). The hinge means 47 may be constructed in various manners and out of various materials as will now be apparent to those skilled in the art. Preferably, the hinge means 47 includes a pair of spaced apart ear members 49 extending outwardly and downwardly from the third wall 43 of the funnel means 29 (see, in general, FIG. 4), a spaced apart plurality of ear members 51 extending upwardly from the base means 21, and axle means 53 for pivotally attaching the ear members 51 and the ear members 53 together as will now be apparent to those skilled in the art to allow the funnel means 29 to be moved between the opened and closed positions. The ear members 49, 51 may be constructed in various manners and out of various materials. Preferably, the ear members 49 are molded out of plastic as a rigid, one-piece, integral unit with the funnel means 29 and the ear members 51 are molded out of plastic as a rigid, one-piece, integral unit with the base means 21 as will now be apparent to those skilled in the art. The axle means 53 may consist of one or more conventional wide head pins with a washer and locking pins or the like (not shown) and which allow the base means 21 and funnel means 29 to be separated by merely removing the pins as will now be apparent to those skilled in the art.

The apparatus 11 preferably includes latch means 55 for locking the funnel means 29 in the closed position. The latch means 29 may consist of a typical clip type latch including a first component 57 fixedly attached to the base member 21 at a location opposite the ears members 51, and including a second component 59 fixedly attached to the funnel means 29 at a location opposite the ear members 49 for coacting with the first component 57 to lock the funnel means 29 to the base means 21 as will now be apparent to those skilled in the art.

The apparatus 11 preferably includes brace means 61 for holding the funnel means 29 in the opened position as shown in FIG. 3. The brace means 61 preferably includes a rod member 63 hingably attached to the base mean 21 for movement between a first or down position as shown in FIG. 6 in which the funnel means 29 can be moved to the closed position and a second or raised position as shown in FIG. 3 in which the funnel means 29 is held in the opened position. More specifically, the rod member 63 is preferably C-shaped, having a first end 65 for being pivotally attached to the base means 21 on one side of the opening 23, a second end 67 for being pivotally attached to the base means 21 on the other side of the opening 23, and a midportion 69 extending between the first and second ends 65, 67 as shown in FIG. 5. The rod member 63 may be constructed in various manners and out of various materials. Preferably, the rod member 63 is bent from an elongated metal rod or the like as will now be apparent to those skilled in the art. Ear members 71 are preferably provided on the base means 21 for pivotally attaching the first and second ends 65, 67 of the rod member 63 to the base means 21. The ear members 71 may be constructed in various manners and out of various materials. Preferably, the ear members 71 are molded out of plastic as a rigid, one-piece, integral unit with the base means 21 as will now be apparent to those skilled in the art. The funnel means 29 preferably has a notch for receiving a portion of the rod member 63 when the rod member 63 is in the second position to securely hold the funnel means 29 in the open position as will now be apparent to those skilled in the art. More specifically, the funnel means 29 preferably has a first notch 73 across one side of the groove portion 37 for receiving one end of the midportion 69 of the rod member 63 and a second notch 75 across the opposite side of the groove portion 37 for receiving the other end of the midportion 69 of the rod member 63 (see, in general, FIG. 4).

The apparatus 11 preferably includes support means 77 for being attached to the base means 21 and for supporting the base means 21 and the funnel means 29 above a supporting surface 79 such as the ground. The support means 77 is preferably movable between an in-used position as shown in FIGS. 1-3 and a stored, folded position as shown in FIG. 10. The support means 77 preferably includes a first leg means 81 for being attached to one end of the base means 21 and a second leg means 83 for being attached to the other end of the base means 21. Each leg means 81, 83 is preferably substantially U-shaped with a pair of spaced apart legs 84 and a bight portion 85 extending between one end of each leg 84. Each leg means 81, 83 may be constructed in various manners and out of various materials as will now be apparent to those skilled in the art. For example, each leg means 81, 83 may be bent out of an elongated metal tube or the like into a substantially U-shape.

A groove 86 is preferably provided across the bottom of each end of the base means 21 (see, in general, FIG. 6) for pivotally receiving the bight portion 85 of each leg means 81, 83 (see, in general, FIG. 6). One or more plates 87 may be permanently attached to the bottom of the base means 21 across one of the grooves 86 (see FIG. 6) by a plurality of screws or the like to permanently but pivotally attach the first leg means 81 to the base means 21. One or more plates 89 may be movably attached to the bottom of the base means 21 across the other one of the grooves 86 (see FIG. 6) by a single screw or the like which acts as a pivot to removably attach the second leg means 83 to the base means 21 as will now be apparent to those skilled in the art. Pivot means 91 are preferably provided for pivotally attaching the first and second leg means 81, 83 to one another. The pivot means 91 may consist of a first rivet or the like extending through one of the legs 84 of the first leg means 81 and one of the legs 84 of the second leg means 83 substantially midway between the opposite ends thereof, and a second rivet or the like extending through the other one of the legs 84 of the first leg means 81 and the other one of the legs 84 of the second leg means 83 substantially midway between the opposite ends thereof. The pivot means 91 allows the first and second leg means 81, 83 to be pivoted from an open, in-use position as clearly shown in FIGS. 2, 3, and 8 to a closed, folded position as shown in FIG. 10 by merely moving the plates 89 to allow the bight portion 85 of the second leg means 83 to be removed from the groove 86 and pivoted to the closed, folded position. The leg means 81, 83 are preferably sized so that one of the leg means 81, 83 will nest within the other leg means 81, 83 when in the closed, folded position as will now be apparent to those skilled in the art.

The apparatus 11 may include a bottom means 92 for supporting the bottom of the trash bag 13 when the apparatus is in the vertical position. The bottom means 92 preferably includes a pan member 93 for being removably attached to the leg means 81, 83. More specifically, a first rod member 95 preferably extends between the legs 84 of the first leg means 81 substantially adjacent the distal end of each leg 84, and a second rod member 97 preferably extends between the legs 84 of the second leg means 83. Each rod member 95, 97 is preferably located 2.5 inches from the distal ends of the respective legs 84. The pan member 93 preferably has a plurality of hooks 99 on the first end thereof for being hooked over the first rod member 95 and preferably has a plurality of hooks 101 on the second end thereof for being hooked over the second rod member 97 to thereby allow the pan member 93 to be easily attached to and removed from the rod members 95, 97 as will now be apparent to those skilled in the art. The hooks 99 preferably include an elongated neck 103 (see FIG. 12) so that the upper support surface of the pan member 93 will slope downward from the second end to the first end with both rod members 95, 97 positioned equal distances from the supporting surface 79 as will now be apparent to those skilled in the art (see, for example, FIGS. 2 and 3. The pan member 93 is preferably provided with ridges 105 to improve the strength of the pan member 93, etc. The pan member 93 may be constructed in various manners and out of various materials as will now be apparent to those skilled in the art. For example, the pan member 93 may be pressed out of sheet metal or the like.

The apparatus 11 may include wall means 107 for substantially closing one end of the apparatus 11 and for supporting the trash bag 13 when the apparatus 11 is in the horizontal position as shown in FIG. 8. The wall means 107 may be positioned between the bight portion 85 of the second leg means 83 and the distal end of the first leg means 81 to support the trash bag 13 when the apparatus 11 is tipped over slightly toward the horizontal position as shown in FIG. 8 for moving, or tipped over completely to the horizontal position as shown in FIG. 8 to use the dust pan feature, etc., as will now be apparent to those skilled in the art. The wall means 107 preferably includes a plurality of web members 109 extending between the first rod member 95 and the bight portion 85 of the second leg means 83. The ends of each web member 109 may be looped over the respective rod member 95 or bight portion 85 and secured by a rivet 111 or the like as clearly shown in FIG. 6. The wall means 107 may include a plurality of cross web members 113 for extending across the plurality of web members 109 as clearly shown in FIG. 1 to strengthen the web members 109, etc. The distal ends of the cross web members 113 may be stitched or otherwise fixedly attached to respective ones of the web members 109 as will now be apparent to those skilled in the art. It should be noted that the wall means 107 may be positioned between the bight portion 85 of the first leg means 81 and the distal end of the second leg means 83 (i.e., on the opposite end of the apparatus 11 from that shown in FIGS. 2 and 3) or, alternatively, a second wall means (not shown) may be provided for being positioned between bight portion 85 of the first leg means 81 and the distal end of the second leg means 83 and for substantially blocking both ends of the apparatus 11.

The apparatus 11 may include wheel means for rollably supporting the apparatus 11 and for allowing easy movement of the apparatus 11 over the supporting surface 79. More specifically, the apparatus 11 may include a first wheel member 115 for being attached to one leg 84 of the first leg means 81 and a second wheel member 117 for being attached to the distal end of the second leg 84 of the first leg means 81 as shown in FIGS. 1 and 3. The wheel members 115, 117 are preferably attached to the distal ends of the first rod member 95. More specifically, the distal ends of the first rod member 95 may extend outward of the legs 84 of the first leg member 81 and the wheel members 115, 117 may be pivotally mounted on the respective distal ends thereof. Typical press-on type hub caps or the like may be used to secure the wheel members 115, 117 to the rod member 95 as will now be apparent to those skilled in the art. It should be noted that the wheel means may include wheel members (not shown) for being attached to the distal ends of each leg 84 of the second leg means 83 for use with the wheel members 115, 117 to fully rollably support the apparatus 11 or for use in lieu of the wheel members 115, 117.

Although the present invention has been described and illustrated with respect to a preferred embodiment and a preferred use therefor, it is not to be so limited since modifications and changes can be made therein which are within the full intended scope of the invention.

I claim:

1. An apparatus for holding a trash bag and for allowing said trash bag to be filled with trash, said trash bag including a hollow body portion having an opened end, said apparatus comprising:
  a) base means having an opening therethrough for allowing said body portion of said trash bag to extend therethrough and having a lip adjacent said opening for allowing said opened end of said body portion of said trash bag to be folded there over; said lip of said base means having an upper surface;
  b) funnel means having an opened first end for being positioned in communication with said hollow body portion of said trash bag and within said opening of said base means and having an opened second end, said funnel means having a passageway extending between said first and second ends for allowing trash inserted into said second end to pass therethrough into said hollow body portion of said trash bag, the cross-sectional area of said passageway at said second end of said funnel means being larger than the cross-sectional area of said passageway at said first end of said funnel means and larger than the cross-sectional area of said opened end of said body portion of said trash bag; said first end of said funnel means having a bottom portion for coacting with said lip of said base means to clamp said first end of said trash bag there between; said bottom portion of said first end of said funnel means having a lower surface;
  c) hinge means attaching said funnel means to said base means for allowing said funnel means to be moved between an opened position and a closed position;
  d) support means for being attached to said base means and for supporting said base means above a supporting surface; said support means being movable between an in-use position and a stored position;
  e) latch means for locking said funnel means in said closed position; and
  f) brace means for holding said funnel means in said opened position with the angle of rotation of said funnel means between said closed position and said opened position being less than 110 degrees.

2. The apparatus of claim 1 in which said lower surface of said bottom portion of said first end of said funnel means has a groove portion for coacting with said lip of said base means to clamp said first end of said trash bag there between.

3. The apparatus of claim 2 in which said upper surface of said lip of said base means has a convexed upper surface, and in which said groove portion of said first end of said funnel means has a concaved lower surface.

4. An apparatus for holding a trash bag and for allowing said trash bag to be filled with trash, said trash bag including a hollow body portion having an opened end, said apparatus comprising:
  a) base means having an opening therethrough for allowing said body portion of said trash bag to extend therethrough and having a lip adjacent said opening for allowing said opened end of said body portion of said trash bag to be folded there over; said lip of said base means having an upper surface;
  b) funnel means having an opened first end for being positioned within said hollow body portion of said trash bag and within said opening of said base means and having an opened second end, said funnel means having a passageway extending between said first and second ends for allowing trash inserted into said second end to pass therethrough into said hollow body portion of said trash bag, the cross-sectional area of said passageway at said second end of said funnel means being larger than the cross-sectional area of said passageway at said first end of said funnel means and larger than the cross-sectional area of said opened end of said body portion of said trash bag; said first end of said funnel means having a groove portion for coacting with said lip of said base means to clamp said first end of said trash bag there between; said groove portion of said first end of said funnel means having a concaved lower surface;
  c) hinge means attaching said funnel means to said base means for allowing said funnel means to be moved between an opened position and a closed position;

d) support means for being attached to said base means and for supporting said base means above a supporting surface; said support means being movable between an in-use position and a stored position;

e) latch means for locking said funnel means in said closed position; and f) brace means for holding said funnel means in said opened position.

5. The apparatus of claim 4 in which said brace means includes a rod member hingably attached to said base means for movement between a first position in which said funnel means can be moved to said closed position and a second position in which said funnel means is held in said opened position.

6. The apparatus of claim 5 in which said funnel means has a notch for receiving a portion of said rod member of said brace means when said rod member is in said second position.

7. The apparatus of claim 6 in which said apparatus has a vertical position in which trash can be dropped through said funnel means into said hollow body portion of said trash bag, and a horizontal position in which trash can be swept through said funnel means into said hollow body portion of said trash bag.

8. The apparatus of claim 7 in which said support means includes a first leg means for being attached to one end of said base means and a second leg means for being attached to the other end of said base means.

9. The apparatus of claim 8 in which each of said leg means is substantially U-shaped with a pair of spaced apart legs and a bight portion extending between one end of each leg thereof.

10. The apparatus of claim 9 in which said base means has a groove across each end thereof for pivotally receiving said bight portion of one of said leg means.

11. The apparatus of claim 10 in which is included a bottom means for supporting the bottom of said trash bag when said apparatus is in said vertical position.

12. The apparatus of claim 11 in which is included wall means for substantially closing one end of said apparatus and for supporting said trash bag when said apparatus is in said horizontal position.

13. The apparatus of claim 12 in which is included wheel means for rollably supporting said apparatus.

* * * * *